Dec. 18, 1951         N. E. HART         2,578,931
WEIGHING SCALE STIRRUP
Filed Dec. 16, 1949
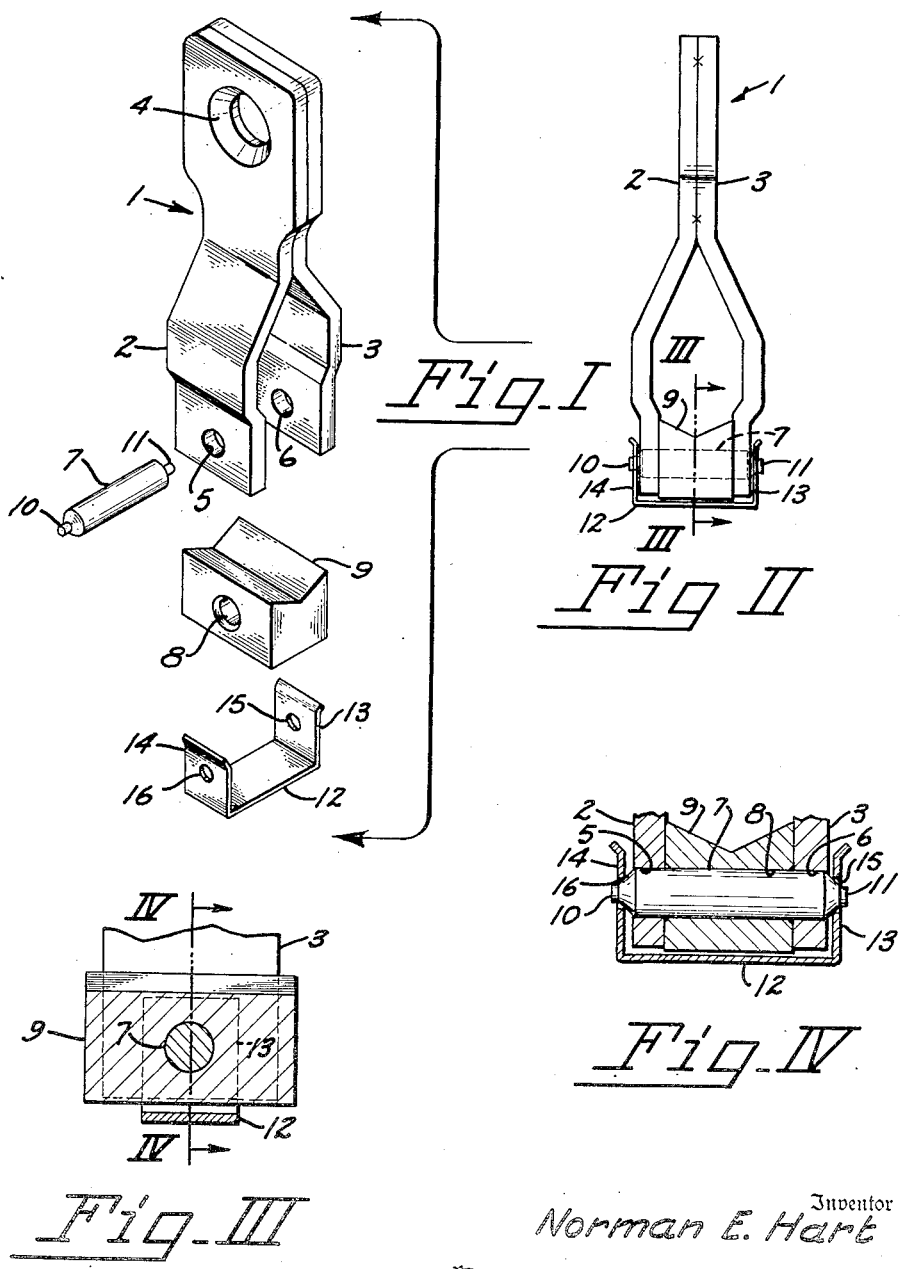
Inventor
Norman E. Hart
Marshall, Marshall & Leonard
Attorneys Patented Dec. 18, 1951

2,578,931

UNITED STATES PATENT OFFICE 2,578,931

WEIGHING SCALE STIRRUP

Norman E. Hart, Toledo, Ohio, assignor to Toledo Scale Company, Toledo, Ohio, a corporation of New Jersey Application December 16, 1949, Serial No. 133,460

4 Claims. (Cl. 308—2)

This invention relates to weighing scale stirrups and in particular to an improved simplified construction having a minimum of parts.

A weighing scale stirrup is used as a connection or a support between a steelyard rod and a V-bearing resting on or engaging a knife edge of a lever. Such a stirrup usually comprises a U-shaped member attached to the steelyard rod, and a pin mounted in the ends of the arms of the U-shaped stirrup to carry a V-bearing. Means, usually in the form of cotter keys, are employed to hold the pin in position and other means are provided to prevent excessive rotation of the V-bearing on the pin.

The principal object of this invention is to provide a simple stirrup construction in which a simple U-shaped spring serves both to hold the pin in position and to prevent the V-bearing from rotating on the pin.

Another object of the invention is to provide a particular configuration or shape for the various elements of the assembly such that the assembly may be easily assembled or disassembled but such that the forces encountered in use cannot dislodge any of the parts from their normal positions.

More specific objects and advantages are apparent from the following description of a preferred embodiment of the invention.

According to the invention the improved weighing scale stirrup comprises a generally U-shaped member attachable to a steelyard rod, the member having aligned holes in the lower portions of its depending legs to receive a pin on which the V-bearing is mounted. The ends of the legs of the U-shaped member and the flat surface of the V-bearing block are substantially in alignment when the bearing is in place on a pin inserted through the holes in the legs of the U-shaped member. A generally U-shaped sheet metal spring is provided to engage cylindrical, reduced diameter portions on the ends of the pin to hold the pin in position with the spring passing closely adjacent the ends of the legs of the U-shaped member and the flat portion of the V-bearing to keep the bearing from rotating on the pin.

A preferred embodiment of the invention is illustrated in the accompanying drawings.

In the drawings:

Figure I is a view of the bearing and stirrup showing the individual parts ready for assembly.

Figure II is a side elevation of the assembled stirrup and bearing.

Figure III is a fragmentary vertical section taken substantially along the line III—III of Figure II.

Figure IV is a fragmentary vertical section taken substantially along the line IV—IV of Figure III.

These specific figures and the accompanying description are intended merely to illustrate the invention but not to limit its scope.

The improved stirrup and bearing comprises a generally U-shaped stirrup 1 which is preferably made of formed flat stock bent to the desired configuration. In the example shown two pieces 2 and 3 are employed which are welded together throughout their upper juxtaposed areas and drilled to provide a hole 4 to receive a hook of a steelyard rod or other connection. The lower ends of the members 2 and 3 are spaced apart and parallel and are each drilled thus providing aligned holes 5 and 6 to receive a pin 7 which, fitting through a hole 8 in a V-bearing block 9, supports the V-bearing block 9 in the stirrup 1.

The pin 7, as may be seen in Figures I, II and IV, has a relatively large diameter central section that fits through the holes 5, 6 and 8 and is of a length just sufficient to reach from the outside surface of one of the stirrup members 2 to the outside surface of the other member 3. The pin 7 is provided with axially extending small diameter trunnions 10 and 11.

A U-shaped sheet metal spring 12 having upstanding leg portions 13 and 14 is provided to hold the pin 7 in place in the stirrup assembly and also to prevent the V-bearing block 9 from rotating on the pin 7. To accomplish these results the upstanding legs 13 and 14 of the spring have holes 15 and 16 that are loose fits over the small diameter trunnions 10 and 11 of the pin 7. The upper ends of the legs 13 and 14 of the spring 12 are bent outward so that, in assembly, after the V-bearing 9 and pin 7 are in position the spring 12 may be easily pushed into place with the legs 13 and 14 snapping over the ends of the pin 7.

The ends of the spring 12 normally bear against the ends of the pin 7 with considerable force. Any tendency of the pin 7 to slide axially out of place brings one or the other of the legs 13 or 14 of the spring 12 into contact with the adjacent surface of the legs 2 or 3 of the stirrup thus stopping further motion of the spring 12 and pin 7.

Rotary movement of the bearing 9 on the pin 7, sufficient for the bearing to accommodate itself to a knife edge with which it cooperates, is allowed by the clearance between the bottom section of the spring 12 and the bottom of the V-bearing block 9. This clearance is illustrated in Figure III. Any further rotary movement of the V-bearing block 9 causes the bottom of the V-bearing block to engage one or the other of the edges of the bottom section of the U-shaped spring 12 thus rotating the spring 12 along with the bearing block 9. This rotation continues until the spring 12 engages the ends of the stirrup 1—the lower surfaces of the members 2 and 3 forming the stirrup—thus preventing further movement. At this point considerable force may be exerted against the spring in a downward direction tending to dislodge the spring 12 from its engagement with the ends of the pin 7. If such ends are conical instead of cylindrical the spring 12 may be pulled off the ends of the pin 7 thus deranging the assembly. However, with the cylindrical reduced diameter end sections there is no chance for any downward force applied to the spring 12 to spread the ends of the spring 12 to disengage it from the ends 10 and 11 of the pin 7. As a result the assembly can withstand any of the forces ordinarily encountered in actual service.

If during a servicing operation of the scale it is desired to disconnect the stirrup 1 from the lever this may be readily accomplished by merely inserting the point of a screwdriver between one of the ends 13 or 14 of the spring 12 and the adjacent surface of the stirrup 1 thus springing the end of the spring 12 off the pin. The pin 7 can then be easily removed thus allowing the bearing and stirrup to be removed from the lever.

This structure thus provides, with a minimum of parts, provision for holding the V-bearing and its supporting pin in a stirrup and also for preventing the bearing from rotating beyond the required limits. The improved structure is easily assembled and disassembled but is sufficiently strong to resist any disturbing forces likely to be encountered in use.

Various modifications may be made in the specific details of the device without departing from the spirit and scope of the invention.

I claim:

1. A weighing scale stirrup comprising a U-shaped member having a pair of parallel spaced apart arms each having a hole and a non-circular end, a pin inserted through the holes in the arms of the member, a V-bearing block including a generally flat surface mounted on the pin intermediate the arms of the member, and a spring that engages the ends of the pin and that passes closely adjacent the non-circular ends of the arms of the member and the flat surface of said bearing for holding the pin in position and the bearing against rotation on the pin.

2. A weighing scale stirrup comprising a U-shaped member having a pair of parallel spaced apart arms each having a hole and a non-circular end, a cylindrical pin inserted through the holes in the arms of the member, said pin having reduced diameter end portions, a V-bearing block including a generally flat surface mounted on the pin intermediate the arms of the member, and a spring engaging the reduced diameter end portions of the pin adjacent its large diameter portion and passing closely adjacent the non-circular ends of the arms of the member and the flat surface of the bearing for holding the pin in the member and for preventing rotation of the bearing.

3. A weighing scale stirrup comprising a U-shaped member having a pair of parallel spaced apart arms each having a hole and a non-circular end, a cylindrical pin inserted through the holes in the arms of the U-shaped member, said pin having reduced diameter cylindrical end sections forming shoulders, a V-bearing block including a generally flat surface mounted on the pin, and a spring that fits against the shoulders at the ends of the pin and passes closely adjacent the non-circular ends of the arms of the member and the flat surface of the bearing for holding the pin and the bearing in operative position.

4. A weighing scale stirrup comprising a U-shaped member having a pair of parallel spaced apart arms each having a hole and a non-circular end, a cylindrical pin inserted through the holes in the arms of the U-shaped member, said pin having reduced diameter end sections forming shoulders, a V-bearing block including a generally flat surface mounted on the pin, and a U-shaped sheet metal spring having a hole in each leg to fit against the shoulders of the pin with the bottom of the U-shaped spring lying closely adjacent the flat surface of the bearing and the non-circular ends of the arms to prevent rotation thereof.

NORMAN E. HART.

REFERENCES CITED

The following references are of record in the file of this patent:

UNITED STATES PATENTS

| Number | Name | Date |
| --- | --- | --- |
| 661,087 | Stimpson | Nov. 6, 1900 |
| 1,143,647 | Riedel | June 22, 1915 |

FOREIGN PATENTS

| Number | Country | Date |
| --- | --- | --- |
| 283,313 | Great Britain | Jan. 12, 1928 |